(12) United States Patent
Guo et al.

(10) Patent No.: US 11,263,423 B2
(45) Date of Patent: Mar. 1, 2022

(54) FINGERPRINT IDENTIFICATION STRUCTURE AND DISPLAY DEVICE

(71) Applicant: BOE TECHNOLOGY GROUP CO., LTD., Beijing (CN)

(72) Inventors: Yuzhen Guo, Beijing (CN); Yingming Liu, Beijing (CN); Haisheng Wang, Beijing (CN); Lijun Zhao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/651,000

(22) PCT Filed: Oct. 17, 2019

(86) PCT No.: PCT/CN2019/111702
§ 371 (c)(1),
(2) Date: Mar. 26, 2020

(87) PCT Pub. No.: WO2020/155671
PCT Pub. Date: Aug. 6, 2020

(65) Prior Publication Data
US 2021/0216735 A1 Jul. 15, 2021

(30) Foreign Application Priority Data
Jan. 28, 2019 (CN) .................. 201910080353.X

(51) Int. Cl.
*G06K 9/00* (2006.01)
*G06F 21/32* (2013.01)
(Continued)

(52) U.S. Cl.
CPC ........... *G06K 9/0002* (2013.01); *G06F 21/32* (2013.01); *G06F 21/84* (2013.01); *G10K 9/122* (2013.01)

(58) Field of Classification Search
None
See application file for complete search history.

(56) References Cited

U.S. PATENT DOCUMENTS

2017/0090028 A1* 3/2017 Djordjev ................. G01S 7/521
2017/0323133 A1* 11/2017 Tsai ....................... B06B 1/0622
(Continued)

FOREIGN PATENT DOCUMENTS

| CN | 106227446 A | 12/2016 |
| CN | 106951130 A | 7/2017 |

(Continued)

OTHER PUBLICATIONS

English machine translation of Chinese patent publication 10729909. (Year: 2017).*

(Continued)

*Primary Examiner* — Nicholas J Lee
(74) *Attorney, Agent, or Firm* — Dilworth & Barrese, LLP.; Michael J. Musella, Esq.

(57) ABSTRACT

At least one embodiment of the present disclosure provides a fingerprint identification structure and a display device. At least one embodiment of the present disclosure provides a fingerprint identification structure, including: an ultrasonic emission component including a plurality of ultrasonic emission units arranged in a two-dimensional array in directions parallel to a plane; and an ultrasonic detection component including a plurality of ultrasonic detection units arranged in a two-dimensional array in the directions parallel to the plane. The ultrasonic emission component and the ultrasonic detection component are two independent structures, and an orthographic projection of at least one ultrasonic detection unit on the plane is included between orthographic projections of two adjacent ones of the plurality of ultrasonic emission units on the plane.

19 Claims, 4 Drawing Sheets

(51) Int. Cl.
*G06F 21/84* (2013.01)
*G10K 9/122* (2006.01)

(56) References Cited

U.S. PATENT DOCUMENTS

2018/0101711 A1* 4/2018 D'Souza ................ G06K 9/228
2019/0095046 A1   3/2019 Guo et al.

FOREIGN PATENT DOCUMENTS

| CN | 107194345 A | 9/2017 |
| CN | 107194384 A | 9/2017 |
| CN | 107229909 A | 10/2017 |
| CN | 107368227 A | 11/2017 |
| CN | 108446685 A | 8/2018 |
| CN | 109614963 A | 4/2019 |

OTHER PUBLICATIONS

English machine translation of WIPO publication WO2019223349. (Year: 2019).*

* cited by examiner

FINGERPRINT IDENTIFICATION STRUCTURE AND DISPLAY DEVICE

The application claims priority of the Chinese patent application No. 201910080353.X, filed on Jan. 28, 2019, the entire disclosure of which is incorporated herein by reference as part of the present application.

FIELD OF TECHNOLOGY

At least one embodiment of the present disclosure relates to a fingerprint identification structure and a display device.

BACKGROUND

An ultrasonic technology is applied to fingerprint identification, which is a hot research topic. An ultrasonic fingerprint identification structure is a three-layer structure including a driving electrode, a receiving electrode, and a piezoelectric layer located between the driving electrode and the receiving electrode. When a driving voltage is applied to the driving electrode and the receiving electrode, the piezoelectric layer is excited by the voltage to emit an ultrasonic wave according to inverse piezoelectric effect. When the ultrasonic wave reach a finger, it is reflected by the finger. Because the finger includes valleys and ridges, the intensities of the ultrasonic vibration reflected by the finger back to the piezoelectric layer are different. By applying a fixed voltage to the driving electrode and not applying a voltage to the receiving electrode, the piezoelectric layer can convert the received ultrasonic wave into a voltage signal and transmit the voltage signal to a fingerprint identification module by the receiving electrode. Based on the voltage signal, positions of the valleys and ridges can be determined.

SUMMARY

At least one embodiment of the present disclosure provides a fingerprint identification structure and a display device.

At least one embodiment of the present disclosure provides a fingerprint identification structure, the fingerprint identification includes an ultrasonic emission component including a plurality of ultrasonic emission units arranged in a two-dimensional array in directions parallel to a plane; and an ultrasonic detection component including a plurality of ultrasonic detection units arranged in a two-dimensional array in the directions parallel to the plane. The ultrasonic emission component and the ultrasonic detection component are two independent structures, and an orthographic projection of at least one of the plurality of ultrasonic detection units on the plane is between orthographic projections of two adjacent ones of the plurality of ultrasonic emission units on the plane.

For example, each of the plurality of ultrasonic emission units includes a first electrode, a first piezoelectric layer, and a second electrode which are stacked in sequence, and each of the plurality of ultrasonic detection units includes a third electrode, a second piezoelectric layer, and a fourth electrode which are stacked in sequence.

For example, a piezoelectric strain constant of the first piezoelectric layer is greater than a piezoelectric strain constant of the second piezoelectric layer, and a piezoelectric voltage constant of the second piezoelectric layer is greater than a piezoelectric voltage constant of the first piezoelectric layer.

For example, a material of the first piezoelectric layer includes lead zirconate-titanate piezoelectric ceramic or aluminum nitride, and a material of the second piezoelectric layer includes polyvinylidene chloride.

For example, the fingerprint identification structure further includes: an insulating layer parallel to the plane. The ultrasonic emission component and the ultrasonic detection component are respectively located on both sides of the insulating layer; or, the ultrasonic emission component and the ultrasonic detection component are located on a same side of the insulating layer, and the ultrasonic emission component and the ultrasonic detection component are located in a same layer.

For example, in the direction parallel to the plane, a minimum size of each of the plurality of ultrasonic emission units is not less than 500 μm.

For example, a distance between two adjacent ones of the plurality of ultrasonic emission units is in a range of 500 μm-5 mm.

For example, the ultrasonic emission component and the ultrasonic detection component are respectively located on both sides of the insulating layer, and orthographic projections of at least two of the plurality of ultrasonic detection units on the plane are located in an orthographic projection of one ultrasonic emission unit on the plane.

For example, in the direction parallel to the plane, each of the plurality of ultrasonic emission units includes a plurality of ultrasonic emission sub-units.

For example, in the direction parallel to the plane, a maximum size of each of the plurality of ultrasonic emission units is less than 100 μm.

For example, a distance between two adjacent ones of the plurality of ultrasonic emission units is in a range of 500 μm-1 mm.

For example, the insulating layer is a base substrate, and at least one of the ultrasonic emission component and the ultrasonic detection component is attached to the base substrate.

At least one embodiment of the present disclosure provides a display device including a display panel, a cover plate, and the above-mentioned fingerprint identification structure. The ultrasonic detection component is located on a side of the ultrasonic emission component facing the cover plate, and there is no gap between sound field regions radiated to a surface of the cover plate away from the fingerprint identification structure by two adjacent ones of the plurality of ultrasonic emission units.

For example, the display panel is located between the fingerprint identification structure and the cover plate, and in the direction parallel to the plane, a minimum size of each of plurality of ultrasonic emission units is not less than 500 μm, and a distance between adjacent ones of the plurality of ultrasonic emission units is in a range of 500 μm-5 mm.

For example, the fingerprint identification structure is located between the display panel and the cover plate, and in the direction parallel to the plane, a maximum size of each of the plurality of ultrasonic emission units is less than 100 μm, and a distance between two adjacent ones of the plurality of ultrasonic emission units is in a range of 500 μm-1 mm.

For example, an orthographic projection of a display region of the display panel on the cover plate does not overlap with an orthographic projection of the fingerprint identification structure on the cover plate.

For example, a sound field region radiated to the cover plate by each of the plurality of ultrasonic emission units includes a main lobe region and a side lobe region surrounding the main lobe region, side lobe regions radiated to the cover plate by adjacent ones of the plurality of ultrasonic emission units are adjacent to each other or partially overlap with each other; or main lobe regions radiated to the cover plate by adjacent ones of the plurality of ultrasonic emission units are adjacent to each other or partially overlap with each other.

BRIEF DESCRIPTION OF THE DRAWINGS

In order to clearly illustrate the technical solution of embodiments of the present disclosure, the drawings of the embodiments will be briefly described in the following. It is obvious that the drawings in the description are only related to some embodiments of the present disclosure and not limited to the present disclosure.

DETAILED DESCRIPTION

In order to make objects, technical details and advantages of the embodiments of the present disclosure apparent, the technical solutions of the embodiment will be described in a clearly and fully understandable way in connection with the drawings related to the embodiments of the present disclosure. It is obvious that the described embodiments are just a part but not all of the embodiments of the present disclosure. Based on the described embodiments herein, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects.

Figure 1A:
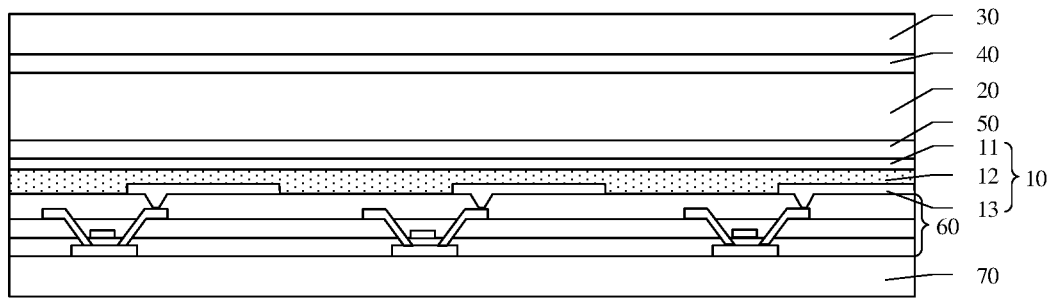
FIGS. 1A and 1B are two different display devices including an ultrasonic fingerprint identification structure.
Figure 1B:
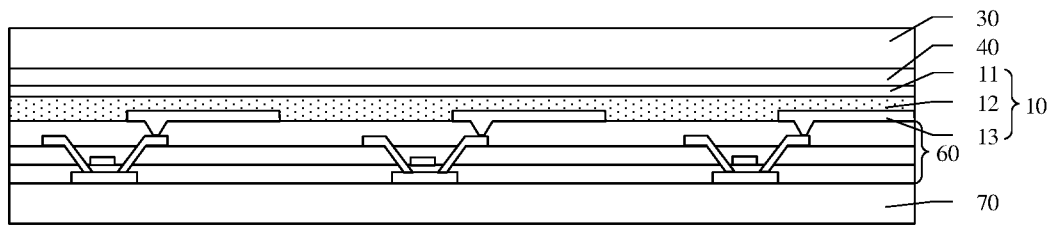

FIGS. 1A and 1B are two different display devices including an ultrasonic fingerprint identification structure. As shown in FIG. 1A, the display device illustrates a cover plate 30, a display panel 20, and a fingerprint identification structure 10. The cover plate 30 and the display panel 20 are bonded with, for example, an optical transparent adhesive 40, and the display panel 20 and the fingerprint identification structure 10 are bonded with an adhesive 50. The display panel 20 can be a liquid crystal display panel or an organic light emitting diode display panel. The fingerprint identification structure 10 includes a driving electrode 11, a receiving electrode 13, and a piezoelectric layer 12 located between the driving electrode 11 and the receiving electrode 13. The driving electrode 11 can be an integral metal layer, and the receiving electrode 13 can be metal electrodes arranged in an array. The receiving electrode 13 provides a driving voltage through a switching transistor 60 provided on a back plate 70, and transmits a voltage signal converted by the piezoelectric layer 12 to the fingerprint identification module. That is, the fingerprint identification structure is used to emit and receive the ultrasonic waves, and is a structure integrated emitting with receiving, i.e., an ultrasonic emission component in the fingerprint identification structure is also used as an ultrasonic detection component. The switching transistor 60 can be a thin film transistor and includes film layers such as a gate electrode, a gate insulating layer, a source electrode, a drain electrode, and an active layer.

As shown in FIG. 1A, when a high-voltage sinusoidal electrical signal is applied to the driving electrode 11 and a fixed voltage is applied to the receiving electrode 13, the piezoelectric layer 12 is excited by the voltage to emit a first ultrasonic wave according to the inverse piezoelectric effect. The first ultrasonic wave reaches a finger placed on a surface of the cover plate 30 away from the fingerprint identification structure 10, and the first ultrasonic wave is reflected back to the fingerprint identification structure 10 by the finger. The reflected ultrasonic wave is a second ultrasonic wave. Because the finger includes valleys and ridges, the intensities of the second ultrasonic vibration reflected by the finger back to the piezoelectric layer 12 are different. At this time, the driving to the receiving electrode 13 is stopped and the voltage applied to the driving electrode 11 is changed to a fixed voltage, so that the piezoelectric layer 12 converts the second ultrasonic wave into a voltage signal. The voltage signal is transmitted to an integrated circuit by the receiving electrode 13, and the positions of the valleys and ridges of the finger are determined by the voltage signal.

As shown in FIG. 1B, the difference from the display device shown in FIG. 1A is in that the cover plate 30 is directly bonded to the fingerprint identification structure 10 with the adhesive 40, that is, the display panel is not disposed between the fingerprint identification structure 10 and the cover plate 30. Compared with the display device shown in FIG. 1A, the transmission path in which the ultrasonic wave emitted by the fingerprint identification structure 10 in the display device shown in FIG. 1B transmits to a finger located on an outer surface of the cover glass 30 is shorter and thus the transmission loss is lower.

Embodiments of the present disclosure provide a fingerprint identification structure and a display device. The fingerprint identification structure includes an ultrasonic emission component and an ultrasonic detection component. The ultrasonic emission component includes a plurality of ultrasonic emission units arranged in an array, and the ultrasonic detection component includes a plurality of ultrasonic detection units arranged in an array. The ultrasonic emission component and the ultrasonic detection component are two independent structures, and an orthographic projection of at least one ultrasonic detection unit on a plane is between two orthographic projections of two adjacent ultrasonic emission units on the plane. The ultrasonic emission component of the fingerprint transmitting structure according to the embodiment includes the plurality of ultrasonic emission units, and each of the ultrasonic emission units corresponds to a target object within a certain range, and does not need to be closely arranged, thereby saving process and costs.

The fingerprint identification structure and the display device according to the embodiments of the present disclosure are described below with reference to the drawings.

Figure 2A:
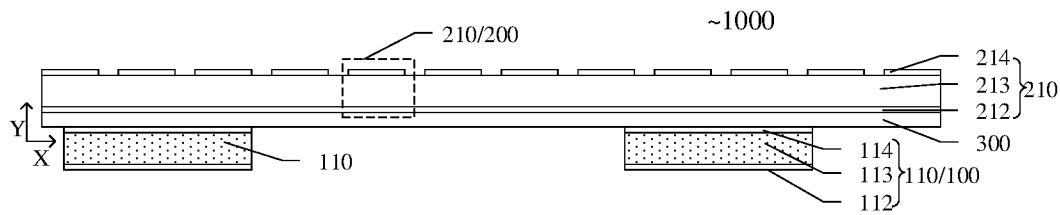
FIG. 2A is a partial cross-sectional view of a fingerprint identification structure according to an example of an embodiment of the present disclosure.
Figure 2B:
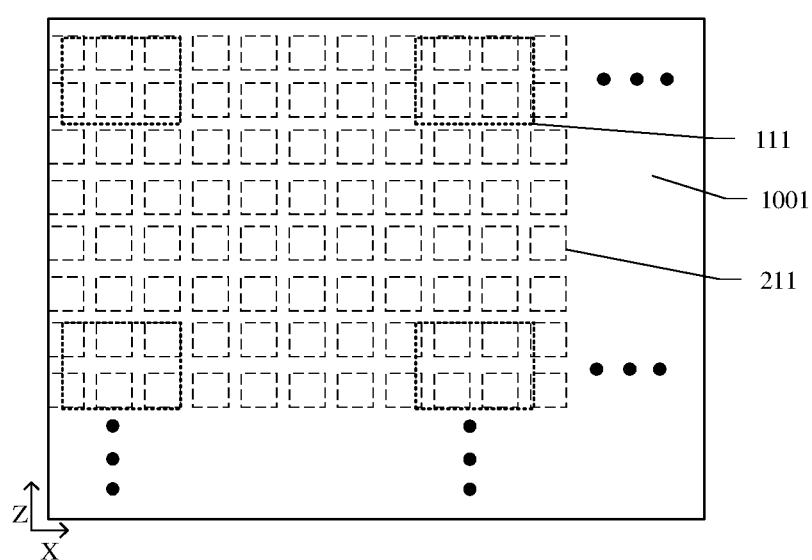
FIG. 2B is a diagram of an orthographic projection relationship between an ultrasonic emission component and an ultrasonic detection component in the fingerprint identification structure shown in FIG. 2A.

An embodiment of the present disclosure provides a fingerprint identification structure. FIG. 2A is a partial cross-sectional view of a fingerprint identification structure according to an example of an embodiment of the present disclosure. FIG. 2B is a diagram showing an orthographic projection relationship of the ultrasonic emission component and the ultrasonic detection component in the fingerprint identification structure shown in FIG. 2A. As shown in FIGS. 2A and 2B, the fingerprint identification structure 1000 in the embodiment includes an ultrasonic emission component 100 and an ultrasonic detection component 200. The ultrasonic emission component 100 includes a plurality of ultrasonic emission units 110 arranged in an array, the ultrasonic detection component 200 includes a plurality of ultrasonic detection units 210 arranged in an array, the ultrasonic emission component 100 and the ultrasonic detection component 200 are two independent structures, and a second orthographic projection 211 of at least one ultrasonic detection unit 210 on a plane 1001 is between two first orthographic projections 111 of two adjacent ultrasonic emission units 110 on the plane. The ultrasonic emission component of the fingerprint transmitting structure according to the embodiment includes a plurality of ultrasonic emission units, and each of the ultrasonic emission units corresponds to a target object within a certain range, and thus a tight distribution to ultrasonic emission units is not required, thereby saving process and costs.

The above-mentioned "ultrasonic emission component and ultrasonic detection component are two independent structures" refers to the ultrasonic emission component is only used to emit ultrasonic waves, and the ultrasonic detection component is only used to receive ultrasonic waves, and both of them are not a structure integrated emitting with receiving, that is, the ultrasonic detection component cannot be also used as the ultrasonic detection component. In the schematic diagrams shown in FIG. 2A and FIG. 2B, a count of the ultrasonic detection units disposed in a gap between two adjacent ultrasonic emission units is illustrated as an example, that is, a count of the second orthographic projections between two adjacent first orthographic projections is illustrated as an example. It can be 1-100, for example, it can be 10, 20, 50, or 70, the embodiment of the present disclosure is not limited thereto.

For example, as shown in FIG. 2A, each of the ultrasonic emission units 110 includes a first electrode 112, a first piezoelectric layer 113, and a second electrode 114 which are stacked in sequence. In a case where a high-voltage sinusoidal electrical signal is applied to one of the first electrode 112 and the second electrode 114 and a fixed voltage is applied to the other of the first electrode 112 and the second electrode 114, the first piezoelectric layer 113 is excited by the voltage to emit a first ultrasonic wave according the reverse piezoelectric effect, the first ultrasonic wave reaches the finger and is reflected back as a second ultrasonic wave by the finger. Here, the positions of the first electrode and the second electrode are interchangeable, provided that they can excite the first piezoelectric layer to emit ultrasonic waves.

For example, as shown in FIG. 2A, each of the ultrasonic detection units 210 includes a third electrode 212, a second piezoelectric layer 213, and a fourth electrode 214 which are stacked in sequence. One of the third electrode 212 and the fourth electrode 214 can be used as a common electrode applied with the fixed voltage, and the other of the third electrode 212 and the fourth electrode 214 is the receiving electrode for transmitting the electrical signal. The embodiment illustrates an example in which the third electrode 212 is the common electrode, and the fourth electrode 214 is the receiving electrode. The fourth electrode 214 included in the ultrasonic detection component 200 includes a plurality of electrodes arranged in an array, and thus in a direction perpendicular to the plane 1001, the second piezoelectric layer 213 and the third electrode 212 corresponding to each of the fourth electrodes 214 and the fourth electrode 214 constitute one of the ultrasonic detection units 210 as shown in the region surrounded by the dotted line in FIG. 2A.

FIG. 2A illustrates that the second piezoelectric layer 213 included in the ultrasonic detection unit 210 is an integral layer structure, and the third electrode 212 included in the ultrasonic detection unit 210 is an integral metal layer, but the embodiment is not limited thereto. For example, the second piezoelectric layer can be a plurality of piezoelectric layers corresponding to the plurality of fourth electrodes one by one, and the third electrode can also be a plurality of electrodes corresponding to the plurality of fourth electrodes one by one. In this case, one piezoelectric layer and one third electrode corresponding each fourth electrode, and the fourth electrode constitute one of the ultrasonic detection units 210.

Upon the fixed voltage being applied to the third electrode 212 and no voltage being applied to the fourth electrode 214, the second piezoelectric layer 213 converts the second ultrasonic signal into an electrical signal, and the fourth electrode 214 transmits the electrical signal to the integrated circuit, thereby identifying the fingerprint.

The fourth electrode in the embodiment can be located on a side of the second piezoelectric layer facing the ultrasonic emission component, or on a side of the second piezoelectric layer away from the ultrasonic emission component, the embodiment of the present disclosure is not limited thereto.

In research, the inventor(s) of the present application found that a material of the piezoelectric layer in a general fingerprint identification structure is polyvinylidene fluoride (PVDF). The polyvinylidene chloride is a piezoelectric material suitable for an acceptor and having a high piezoelectric voltage constant (g), and thus has a high sensitivity to receive the ultrasound waves. However, the polyvinylidene chloride has a low piezoelectric strain constant (d), and thus has a low ability to emit ultrasonic waves, and under a limited driving condition, the ultrasonic energy that can be generated is low. Assuming that the fingerprint identification structure with such material is provided in the display device shown in FIG. 1A, the ultrasonic waves emitted by the piezoelectric layer is required to travel a long distance to reach the fingerprint interface located on the outer surface of the cover plate, resulting in a large transmission loss, so that the ultrasonic energy reaching the fingerprint is very low, thereby affecting the fingerprint identification performance.

For example, as shown in FIG. 2A, the material of the first piezoelectric layer and the material of the second piezoelectric layer in the embodiment are different. The piezoelectric strain constant of the first piezoelectric layer 113 is greater than the piezoelectric strain constant of the second piezoelectric layer 213, and the piezoelectric voltage constant of the second piezoelectric layer 213 is greater than the piezoelectric voltage constant of the first piezoelectric layer 113. That is, the ability of the first piezoelectric layer 113 to emit the ultrasound waves is stronger than the ability of the second piezoelectric layer 213 to emit the ultrasound waves, and the sensitivity of the second piezoelectric layer 213 to receive the ultrasound waves is higher than the sensitivity of the first piezoelectric layer 113 to receive the ultrasound waves. For example, the material of the first piezoelectric layer can be lead zirconate-titanate piezoelectric ceramic (PZT) or aluminum nitride (AlN). In a case where the material of the first piezoelectric layer is the aluminum nitride, the ultrasonic emission unit is suitable for a piezoelectric micromechanical ultrasound transducer (PMUT). Therefore, compared with the fingerprint identification structure integrated emitting with receiving using polyvinylidene fluoride (PVDF), in the embodiment, the first piezoelectric layer is used to emit the ultrasonic waves, and the second piezoelectric layer is used to receive the ultrasonic waves, to achieve the fingerprint identification structure with high emission efficiency and high receiving sensitivity, which not only saves the size of the ultrasonic emission component, but also improves the fingerprint identification performance.

For example, as shown in FIGS. 2A and 2B, the fingerprint identification structure 1000 further includes an insulating layer 300 parallel to the plane 1001, and the ultrasonic emission component 100 and the ultrasonic detection component 200 are respectively located on two sides of the insulating layer 300.

For example, the insulating layer 300 can be a base substrate, for attaching the ultrasonic emission component 100 and the ultrasonic detection component 200. The attaching process can facilitate to manufacture the ultrasonic emission component and the ultrasonic detection component, and the process is flexible. For example, the ultrasonic emission unit can be a silicon-based micro-emitter which is manufactured independently, or a plurality of micro-emitters cut from a large-sized emitter. Alternatively, the ultrasonic emission component can be manufactured on a silicon substrate and then be peeled off and transferred to the base substrate, by the micro transfer process.

Figure 2C:
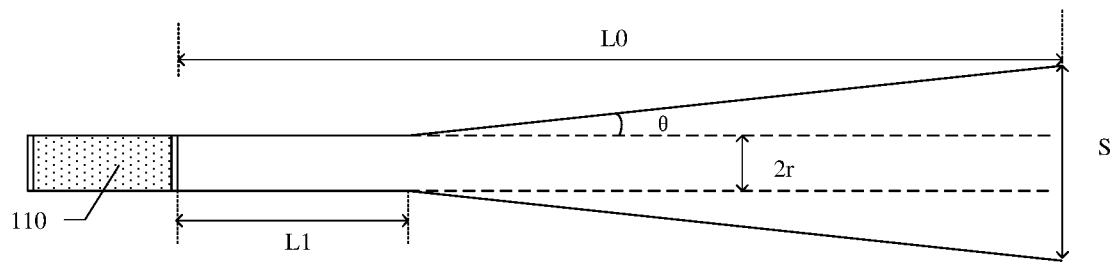
FIG. 2C is a diagram of a state of an ultrasonic wave emitted by the ultrasonic emission unit shown in FIG. 2A during propagation.

For example, FIG. 2C is a diagram of a state of an ultrasonic wave emitted by the ultrasonic emission unit during propagation. As shown in FIGS. 2A to 2C, in the direction parallel to the plane 1001, the minimum size of each of the ultrasonic emission units 110 is not less than 500 µm. In the example, all of the first electrode 112, the first piezoelectric layer 113 and the second electrode 114 included in each of the ultrasonic emission units 110 are continuous film layers. The minimum size of each of the ultrasonic emission units 110 is larger than the wavelength of the ultrasonic wave. The ultrasonic emission unit 110 herein can be referred to as a surface sound source. Such an sound source has good directivity, so that the sound beam can be concentrated in a specific direction. The path of the ultrasonic wave emitted from the sound source during propagation includes a near-field region near the sound source and a far-field region far from the sound source. The near-field region refers to a series of regions where a sound pressure maximum value and a sound pressure minimum value occur near the sound source due to wave interference. The distance between the last sound pressure maximum value and the sound source is a length L1 of the near-field. A region within the L1 is the near-field region, and a region outside the L1 is the far-field region. The near-field region can be called a cylindrical region. The length L of the near-field region satisfies a relationship of $L=r^2/\lambda$, where r is the radius of the sound source and $\lambda$ is the wavelength of the ultrasonic wave. The sound beam of the far-field region is diffused and the far-field region can be called a divergent region. A diffusion angle of the sound beam satisfies a relationship of $\sin \theta = 1.22\lambda/(2\pi)$.

For example, as shown in FIG. 2C, assuming that the display device including the ultrasonic emission unit further includes a display panel and a cover plate, the display panel is located between the fingerprint identification structure and the cover plate, and the ultrasonic emission unit is located on a side of the ultrasonic detection unit away from the cover plate, the distance L0 from the ultrasonic emission unit to the fingerprint identification surface of the cover plate for placing the finger is, for example, 1.5 mm. An example is illustrated in which a size of the ultrasonic emission unit 110 is about 1 mm$^2$, a radius r of the ultrasonic emission unit 110 is about 0.5 mm, and the wavelength of the ultrasonic wave is 500 µm. The length L1 of the near-field region is 0.5 mm, the diffusion angle $\sin \theta$ is 0.61, and S is 2.58 mm Therefore, for each of the ultrasonic emission units having the size about 1 mm$^2$, the radiation range of the emitted ultrasonic wave which travels the transmission distance of 1.5 mm, on the finger can be is about 2.5 mm*2.5 mm Assuming that the size of the ultrasonic detection unit is about 50 µm*50 µm, the above irradiation range can correspond to about 50*50 ultrasonic detection units.

For example, as shown in FIGS. 2A and 2B, the distance between two adjacent ultrasonic emission units 110 can be in a range of 500 µm-5 mm. For example, the distance between two adjacent ultrasonic emission units 110 can be in a range of 500 mm, 1.5 mm-2.5 mm, or 2.5 mm-3.5 mm, etc. The embodiment is not limited thereto, as long as there is no gap between the sound field regions radiated to the cover plate by the two adjacent ultrasonic emission units, and the sound field regions can be closely connected.

For example, as shown in FIGS. 2A and 2B, the second orthographic projections 211 of at least two ultrasonic detection units 210 on the plane 1001 are located within the first orthographic projection 111 of one ultrasonic emission unit 110 on the plane 1001.

FIG. 2B only schematically illustrates the number of the second the orthographic projections 211 within one first orthographic projection 111. For example, the number of the second orthographic projections 211 within the first orthographic projection 111 can be 10-20, 30-100, 50-300, or 200-2000, or the like and it is not limited in the embodiment. The number of the second orthographic projections within the first orthographic projection can be designed according to the actual process and requirements.

The sound field of the ultrasonic wave emitted by the ultrasonic emission unit in the embodiment is a diffuse sound field, and the phases of the diffuse sound field reaching respective positions of the finger on the cover plate are different, that is, the sound wave of the diffuse sound field reaching the respective positions of the finger has a phase difference. Thus, the times for the ultrasonic wave reflected by the finger to reach different ultrasonic detection units are different, and the different ultrasonic detection units receive the ultrasonic waves at different times. For example, the plurality of ultrasonic emission units can emit ultrasonic waves simultaneously, or emit ultrasonic waves successively with a certain time difference. Upon the plurality of ultrasonic emission units emitting ultrasonic waves successively with a certain time difference, the ultrasonic wave emitted by the plurality of ultrasonic emission units can form an additive interference in a target region to enhance the sound wave energy in the region.

Figure 2D:
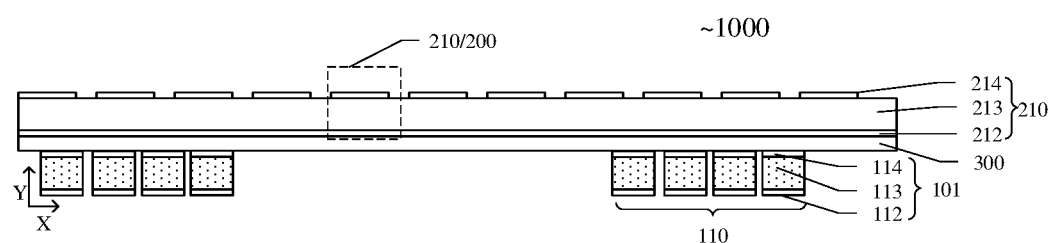
FIG. 2D is a partial cross-sectional view of a fingerprint identification structure according to another example of an embodiment of the present disclosure.

FIG. 2D is a partial cross-sectional view of a fingerprint identification structure according to another example of the embodiment. As shown in FIG. 2D, the minimum size of each of the ultrasonic emission units 110 in the example is not less than 500 μm, each of the ultrasonic emission units 110 is a surface sound source, and each of the ultrasonic emission units 110 includes a plurality of ultrasonic emission sub-units 101. That is, the surface sound source includes the plurality of ultrasonic emission sub-units 101, i.e. the first electrode 112, the first piezoelectric layer 113, and the second electrode 114 included in each of the ultrasonic emission units 110 are not continuous film layers, or at least one electrode is not a continuous film.

For example, the ultrasonic emission sub-units 101 included in each of the ultrasonic emission unit 110 are arranged in an array on the insulating layer 300. Compared with the example shown in FIG. 2A, the ultrasonic emission unit in FIG. 2A in which the electrode and the first piezoelectric layer have a continuous shape are replaced with a plurality of independent ultrasonic emission sub-units with small area in the example, the emission performance of each of the ultrasonic emission units and the overall sound field radiation region are not changed. For example, upon the ultrasonic emission sub-unit in the example being a piezoelectric micromechanical ultrasonic transducer (PMUT), a center frequency of the ultrasonic emission sub-unit (the intensity of the ultrasonic wave emitted by the ultrasonic emission sub-unit at the center frequency is the largest) is related to a size of a diaphragm of the ultrasonic emission sub-unit (slightly smaller than the maximum size of each of the ultrasonic emission sub-units parallel to the insulating layer, such as a diameter). The size of the diaphragm required for the center frequency of about 10 MHz is about 50~80 μm, and the size of the ultrasonic emission sub-unit is 50~100 μm. In this case, a plurality of ultrasonic emission sub-units with a size of 50~100 μm (small size) are required to constitute a larger ultrasonic emission unit, so that the intensity of the emitted ultrasonic waves is stronger.

The arrangement and characteristics of the ultrasound emission units and the arrangement and characteristics of the ultrasound detection units in the example are the same as that of the ultrasound emission units and the ultrasound detection units shown in FIG. 2A, which will be omitted here.

Figure 3A:
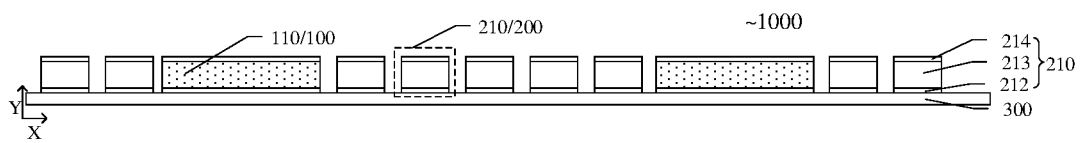
FIG. 3A is a partial cross-sectional view of a fingerprint identification structure according to another example of an embodiment of the present disclosure.

FIG. 3A is a partial cross-sectional view of a fingerprint identification structure according to another example of the embodiment. As shown in FIG. 3A, the ultrasonic emission component 100 and the ultrasonic detection component 200 are located on the same side of the insulating layer 300, and the ultrasonic emission component 100 and the ultrasonic detection component 200 are located in the same layer. Here, "the ultrasonic emission component 100 and the ultrasonic detection component 200 are located in the same layer" refers to both of them are disposed on the insulating layer 300. An example in which the plurality of ultrasonic detection units 210 between two adjacent ultrasonic emission units 110 form an ultrasonic detection unit group is illustrated. In a direction parallel to the insulating layer 300, for example, in the X direction, the ultrasonic emission units 110 and the ultrasonic detection unit groups are arranged alternately. In a case where the ultrasonic emission component 100 and the ultrasonic detection component 200 are located in the same layer, the second piezoelectric layer 213 and the third electrode 212 included in the ultrasonic detection component 200 cannot be, for example, a continuous layer as a whole, but the second piezoelectric layer 213 and the third electrode 212 in the ultrasonic detection unit group can be a continuous film layer. For example, one electrode of the ultrasonic detection unit and one electrode of the ultrasonic emission unit are in the same layer, and the other electrode of the ultrasonic detection unit and the other electrode of the ultrasonic emission unit are in the same layer, and the piezoelectric layer of the ultrasonic detection unit and the piezoelectric layer of the ultrasonic emission unit are in the same layer.

In the example, the ultrasonic emission component and the ultrasonic detection component are located in the same layer. The distance between the ultrasonic emission component and the finger can be reduced, and the attenuation degree of the ultrasonic waves emitted by the ultrasonic emission component can be effectively reduced, so that the requirement for the piezoelectric strain constant of the first piezoelectric layer of the ultrasonic emission component can be lowered. For example, in the example, the material of the first piezoelectric layer of the ultrasonic emission component and the material of the second piezoelectric layer of the ultrasonic detection component can be the same, for example, both are polyvinylidene fluoride (PVDF). In addition, the manner that the ultrasonic emission component and the ultrasonic detection component are disposed in the same layer will not affect the reception of the ultrasonic waves, that is, it will not affect the identification performance of the fingerprint identification structure.

The arrangement and characteristics of the ultrasound emission units and the arrangement and characteristics of the ultrasound detection units in the example are the same as the that of the ultrasound emission units and the ultrasound detection units shown in FIG. 2A, and will be omitted here.

Figure 3B:
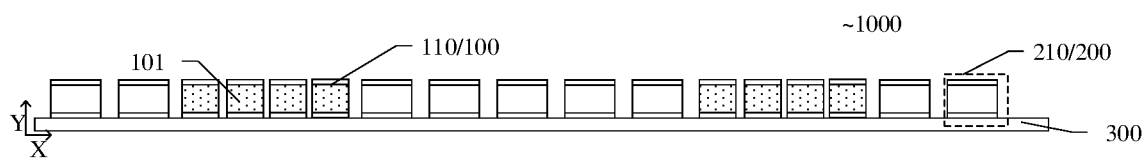
FIG. 3B is a partial cross-sectional view of a fingerprint identification structure according to another example of an embodiment of the present disclosure.

FIG. 3B is a partial cross-sectional view of a fingerprint identification structure according to another example of the embodiment. As shown in FIG. 3B, compared with the example shown in FIG. 3A, the ultrasonic emission unit in FIG. 3A in which the electrode and the first piezoelectric layer have a continuous shape are replaced with a plurality of independent ultrasonic emission sub-units with small area in the example illustrated in FIG. 3B. In this case, the emission performance of each of the ultrasonic emission units and the overall sound field radiation region are not changed. Furthermore, in this example, even when one or several ultrasonic emission sub-units in each of the ultrasonic emission units are damaged and cannot emit ultrasonic waves, as long as the sound field coverage region of the ultrasonic waves emitted by other ultrasonic emission sub-units can satisfy the coverage requirement, the ultrasonic emission unit can operate normally, so as to improve the yield of the ultrasonic emission component.

The arrangement and characteristics of the ultrasound emission units and the arrangement and characteristics of the ultrasound detection units in the example are the same as that of the ultrasound emission unit and the ultrasound detection unit shown in FIG. 2A, and will be omitted here.

Figure 4A:
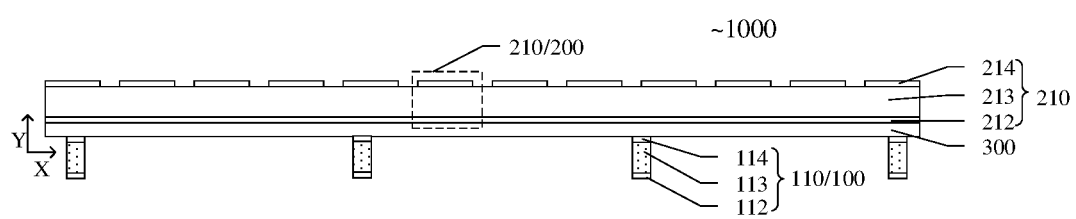
FIG. 4A is a partial cross-sectional view of a fingerprint identification structure according to another example of an embodiment of the present disclosure.

FIG. 4A is a partial cross-sectional view of a fingerprint identification structure according to another example of the embodiment. As shown in FIG. 4A, the ultrasonic emission component 100 and the ultrasonic detection component 200 in the example are respectively located on both sides of an insulating layer 300, and the insulating layer 300 can be a base substrate for attaching the ultrasonic emission component 100 and the ultrasonic detection component 200; alternatively, the ultrasonic emission component 100 can be manufactured on a silicon substrate, and then be peeled off and transferred to the base substrate, by the micro transfer process.

For example, as shown in FIG. 4A, in the direction parallel to the insulating layer 300, the maximum size of each of the ultrasonic emission units 110 is less than 100 μm. The maximum size of each of the ultrasonic emission units 110 is less than the wavelength of the ultrasonic wave, and the ultrasonic emission unit 110 can be referred to as a point sound source. The sound field radiation of the point sound source is similar to a spherical surface, has a strong diffusion ability, and can cover a larger region. However, due to the strong sound field diffusion of the point sound source, the sound field is attenuated seriously, and the attenuation degree is inversely proportional to the square of the distance. Therefore, the point sound source is suitable for being located near the cover plate to achieve the fingerprint identification.

Figure 4B:
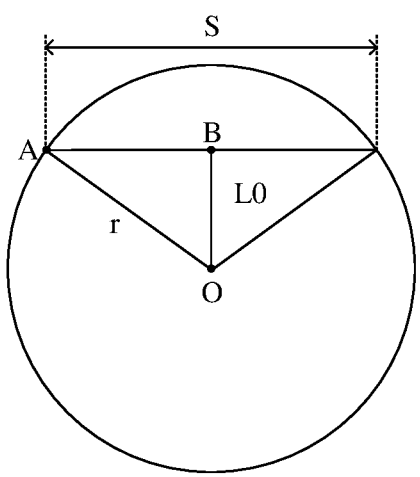
FIG. 4B is a diagram of a radiated sound field region of an ultrasonic wave emitted by the ultrasonic emission unit shown in FIG. 4A.

For example, FIG. 4B is a diagram of a sound field region radiated by a point sound source. As shown in FIG. 4B, assuming that the display device including the ultrasonic emission unit further includes a cover plate, the ultrasonic emission unit is located on a side of the ultrasonic detection unit away from the cover plate, and the fingerprint identification structure can be directly attached to the cover plate. The distance L0 (the O point is the position of the ultrasonic emission unit and the B point is the position of the finger) of the ultrasonic emission unit from the fingerprint identification surface of the cover plate on which the finger is placed is, for example, 750 μm. In order to ensure that the intensity of the sound wave reaching the finger is as uniform as possible, the intensity of the sound wave at the A point is set to 80% of the intensity of the sound wave at the B point. According to the attenuation principle, the r is about 850 μm, so that the S is in a range of 700 μm~800 μm. For example, the distance between two adjacent ultrasonic emission units can be designed to be in a range of 700 μm~800 μm. Therefore, the radiation range of the ultrasonic wave which is emitted from each of the ultrasonic emission units and travels a transmission distance of 850 μm, on the finger can be about 800 μm*800 μm, and the sound field region of the ultrasonic wave emitted by one of the ultrasonic emission units can cover, for example, (10~15)*(10~15) ultrasonic detection units.

For example, as shown in FIG. 4A, the distance between two adjacent ultrasonic emission units 110 is in a range of 500 μm-1 mm. For example, the distance between two adjacent ultrasonic emission units 110 can be in a range of 500 μm-800 μm, 700 μm-900 μm, or 800 μm-1 mm, etc. The embodiment is not limited, as long as no gap is between the sound field regions radiated to the cover plate by the two adjacent ultrasonic emission units and the sound field regions can be closely connected.

Figure 4C:
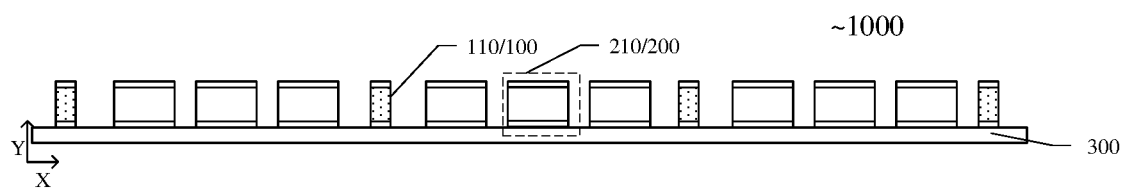
FIG. 4C is a partial cross-sectional view of a fingerprint identification structure according to another example of an embodiment of the present disclosure.

FIG. 4C is a partial cross-sectional view of a fingerprint identification structure according to another example of the embodiment. As shown in FIG. 4C, the ultrasonic emission component 100 and the ultrasonic detection component 200 are located on the same side of the insulating layer 300, and the ultrasonic emission component 100 and the ultrasonic detection component 200 are located in the same layer. Here, "the ultrasonic emission component 100 and the ultrasonic detection component 200 are located in the same layer" refers to both of them are disposed on the insulating layer 300. An example in which the plurality of ultrasonic detection units 210 between two adjacent ultrasonic emission units 110 form an ultrasonic detection unit group is illustrated. In a direction parallel to the insulating layer 300, for example, in the X direction, the ultrasonic emission unit 110 and the ultrasonic detection unit groups are arranged alternately. For example, one electrode of the ultrasonic detection unit and one electrode of the ultrasonic emission unit are in the same layer, and the other electrode of the ultrasonic detection unit and the other electrode of the ultrasonic emission unit are in the same layer, and the piezoelectric layer of the ultrasonic detection unit and the piezoelectric layer of the ultrasonic emission unit are in the same layer.

In the example, the ultrasonic emission component and the ultrasonic detection component are located in the same layer. The distance between the ultrasonic emission component and the finger can be reduced, and the attenuation degree of the ultrasonic waves emitted by the ultrasonic emission component can be effectively reduced, so that the requirement for the piezoelectric strain constant of the first piezoelectric layer of the ultrasonic emission component can be lowered. For example, in this example, the material of the first piezoelectric layer of the ultrasonic emission component and the material of the second piezoelectric layer of the ultrasonic detection component can be the same, for example, both are polyvinylidene fluoride (PVDF).

Figure 5:
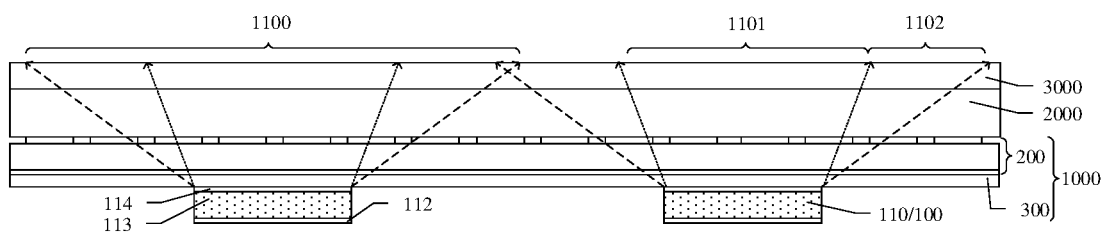
FIG. 5 is a partial structural diagram of a display device according to an example of another embodiment of the present disclosure.

FIG. 5 is a partial structural diagram of a display device according to an example of another embodiment of the present disclosure. The display device in the embodiment includes the fingerprint identification structure according to any one of the above examples. FIG. 5 illustrates that the fingerprint identification structure 1000 is the fingerprint identification structure shown in FIG. 2A. As shown in FIG. 5, the display device further includes a display panel 2000 and a cover plate 3000. The ultrasonic detection component 200 is located on the side of the ultrasonic emission component 100 facing the cover plate 3000, and there is no gap between the sound field regions 1100 radiated to a surface of the cover plate 3000 away from the fingerprint identification structure 1000 by the adjacent ultrasonic emission units 110.

For example, as shown in FIG. 5, the sound field region 1100 radiated to the cover plate 3000 by each of the ultrasonic emission units 110 includes a main lobe region 1101 and a side lobe region 1102 surrounding the main lobe region 1101. The main lobe region 1101 is a region where most part of the sound wave energy is distributed, that is, the ultrasonic wave in the main lobe region 1101 is the main beam, and the sound wave intensity distribution in this region is most concentrated. The main lobe region 1101 is a region where the attenuation of the sound radiation intensity of the main beam is not more than 3 dB (the power density is reduced by half). The side lobe region 1102 is a region where a small part of the sound wave energy is distributed, the ultrasonic wave in the side lobe region is a beam with low energy distributed around the main beam, and the sound wave radiation intensity in the side lobe region 1102 is smaller than the sound wave radiation intensity in the main lobe region 1101.

In the present embodiment, "there is no gap between the sound field regions 1100 radiated to the cover plate 3000 by the adjacent ultrasonic emission units 110" means that: there is a gap between the main lobe regions 1101 radiated to the cover plate 3000 by the two adjacent ultrasonic emission units 110, and the side lobe regions 1102 radiated to the cover plate 3000 by the two adjacent ultrasonic emission units 110 are adjacent to each other or partially overlap with each other; or the main lobe regions 1101 radiated to the cover plate 3000 by the two adjacent ultrasonic emission units 110 are adjacent to each other or partially overlap with each other.

For example, in a case where the main lobe regions 1101 radiated to the cover plate 3000 by the adjacent two ultrasonic emission units 110 are adjacent to each other or partially overlap with each other, the intensity of the sound wave radiation radiated to the cover plate 3000 from the ultrasonic emission unit 110 is strong, which can achieve better fingerprint identification performance.

For example, there is a gap between the main lobe regions 1101 radiated to the cover plate 3000 by the two adjacent ultrasonic emission units 110, and the side lobe regions 1102 radiated to the cover plate 3000 by the two adjacent ultrasonic emission units 110 are adjacent to each other or partially overlap with each other. In this case, although the intensity of the sound wave radiation in the side lobe region 1102 is not as high as that in the main lobe region 1101, the intensity of the sound wave radiation in the side lobe regions 1102 is uniform and does not affect the fingerprint identification performance of the fingerprint identification structure. In addition, the side lobe regions 1102 radiated to the cover plate 3000 by two adjacent ultrasonic emission units 110 are adjacent to each other or partially overlap with each other, to achieve a manner in which the sound field regions 1100 radiated to the cover plate 3000 by the adjacent two ultrasonic emission units 110 has no gap, so that the distance between the adjacent ultrasonic emission units 110 can be larger to further reduce the number of ultrasonic emission units 110.

For example, in an example of the embodiment, the display panel 2000 is located between the fingerprint identification structure 1000 and the cover plate 3000. The ultrasonic emission unit 110 in the display device is far from a surface of a side of the cover plate 3000 away from the display panel 2000. The ultrasonic wave emitted by the ultrasonic emission unit 110 is required to travel a long distance to reach the fingerprint interface located on the outer surface of the cover plate 3000, resulting a large transmission loss. Therefore, the first piezoelectric layer 113 in the ultrasonic emission unit 110 uses a piezoelectric material with a high piezoelectric strain constant (such as lead zirconate-titanate piezoelectric ceramic (PZT)), so that the energy of the emitted ultrasonic wave is higher to increase the fingerprint identification performance of the display device. In addition, in a direction parallel to the cover plate 3000, the minimum size of each of the ultrasonic emission units 110 is not less than 500 μm, that is, the ultrasonic emission unit 110 uses a surface sound source, and the distance between two adjacent ultrasonic emission units is in a range of 500 μm-5 mm Each of the ultrasonic emission units corresponds to a target object within a certain range, and thus a tight distribution to the ultrasonic emission units is not required, thereby saving process and costs. In the embodiment, the position relationship between the components, the size, material, and arrangement of the ultrasonic emission unit as above mentioned can make the sound intensity and sound field distribution of the emitted ultrasonic waves better.

Figure 6A:
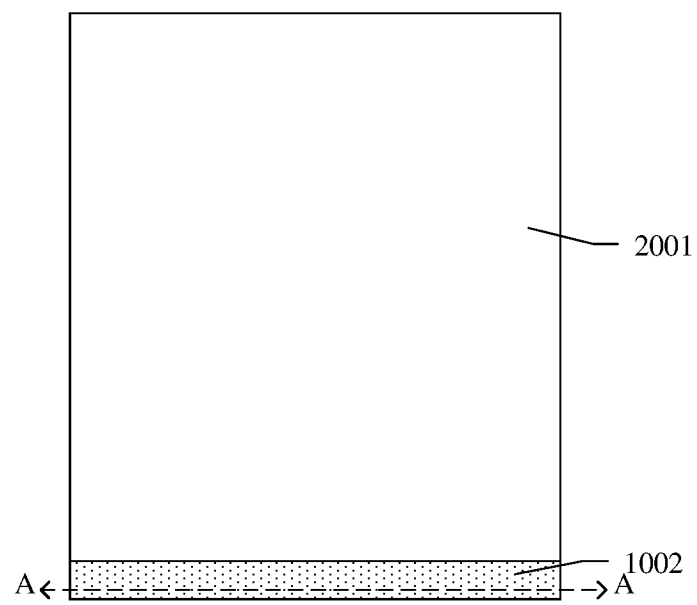
FIGS. 6A and 6B are schematic partial structural diagrams of a display device according to another example of another embodiment of the present disclosure.
Figure 6B:
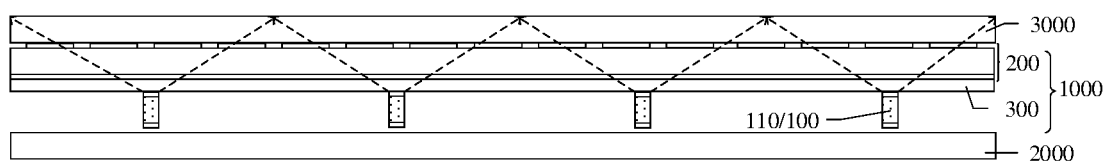

FIGS. 6A and 6B are partial structural diagrams of a display device according to another example of the embodiment, and FIG. 6B is a partial cross-sectional diagram along the line AA in FIG. 6A. The display device in the example includes the fingerprint identification structure according to any of the above examples, and FIG. 6B illustrates that the fingerprint identification structure 1000 is the fingerprint identification structure shown in FIG. 4A. The difference from the example shown in FIG. 5 is that the display panel in the example shown in FIGS. 6A and 6B is not located between the fingerprint identification structure 1000 and the cover plate 3000, that is, the fingerprint identification structure 1000 is directly attached to the cover plate 3000. For example, the orthographic projection of the display region 2001 of the display panel on the cover 3000 and the orthographic projection 1002 of the fingerprint identification structure 1000 on the cover 3000 in the example do not overlap, that is, the fingerprint identification structure 1000 can be located on a non-display region of the display panel, and also can do not overlap with the display panel in a direction perpendicular to the cover plate 3000. In the example, the ultrasonic emission unit 110 is close to the surface of the side of the cover plate 3000 away from the display panel 2000, which can reduce the transmission loss of the ultrasonic waves emitted by the ultrasonic emission unit 110, and thus, the requirement for the piezoelectric strain constant of the first piezoelectric layer can be lowered.

For example, in the direction parallel to the cover plate 3000, the maximum size of each of the ultrasonic emission units 110 is less than 100 μm, that is, the ultrasonic emission unit 110 can be a point sound source, which ability to diffuse the sound field radiation is strong, so that a larger region can be covered. Therefore, the distance between two adjacent ultrasonic emission units 110 can be designed larger. For example, the distance between two adjacent ultrasonic emission units is in a range of 500 μm-1 mm Each of the ultrasonic emission units in the example corresponds to a target object within a certain range, and thus a tight distribution to the ultrasonic emission units is not required, thereby saving process and costs.

The embodiments are not limited to that the ultrasonic emission unit provided on the side of the display panel away from the cover plate is a surface sound source and are not limited to that the ultrasonic emission unit of the fingerprint identification structure directly attached to the cover plate is a point sound source. In such two cases, the surface sound source and the point sound source can be interchanged provided that the fingerprint identification performance of the fingerprint identification structure is not affected.

For example, the display device can be a display device such as a liquid crystal device, an organic light-emitting diode (OLED) display device, and any products or components having displaying function and including the display device, such as a television set, a digital camera, a cell phone, a watch, a tablet, a laptop, a navigator, etc., the embodiments are not limited thereto.

The following statements should be noted:

(1) The accompanying drawings involve only the structure(s) in connection with the embodiment(s) of the present disclosure, and other structure(s) can be referred to common design(s).

(2) In case of no conflict, features in the same embodiment or in different embodiments can be combined.

What is claimed is:

1. A display device comprising a display panel, a cover plate, and a fingerprint identification structure, the fingerprint identification structure comprising an ultrasonic emission component which comprises a plurality of ultrasonic emission units arranged in a two-dimensional array in directions parallel to a plane; and an ultrasonic detection component which comprises a plurality of ultrasonic detection units arranged in a two-dimensional array in the directions parallel to the plane,
wherein the ultrasonic emission component and the ultrasonic detection component are two independent structures, and an orthographic projection of at least one of the plurality of ultrasonic detection units on the plane is between orthographic projections of two adjacent ones of the plurality of ultrasonic emission units on the plane; each of the plurality of ultrasonic emission units comprises a first electrode, a first piezoelectric layer, and a second electrode which are stacked in sequence, and each of the plurality of ultrasonic detection units comprises a third electrode, a second piezoelectric layer, and a fourth electrode which are stacked in sequence; the first piezoelectric layer and the second piezoelectric layer are two independent structures, the first electrode and one of the third electrode and the fourth electrode are two independent structures, and the second electrode and the other of the third electrode and the fourth electrode are two independent structures;
wherein the ultrasonic detection component is located on a side of the ultrasonic emission component facing the cover plate,
wherein there is no gap between sound field regions radiated to a surface of the cover plate away from the fingerprint identification structure by adjacent ones of the plurality of ultrasonic emission units.

2. The display device according to claim 1, wherein the display panel is located between the fingerprint identification structure and the cover plate, and in the direction parallel to the plane, a minimum size of each of the plurality of ultrasonic emission units is not less than 500 μm, and a distance between two adjacent ones of the plurality of ultrasonic emission units is in a range of 500 μm-5 mm.

3. The display device according to claim 1, wherein the fingerprint identification structure is located between the display panel and the cover plate, and in the direction parallel to the plane, a maximum size of each of the plurality of ultrasonic emission units is less than 100 μm, and a distance between two adjacent ones of the plurality of ultrasonic emission units is in a range of 500 μm-1 mm.

4. The display device according to claim 3, wherein an orthographic projection of a display region of the display panel on the cover plate does not overlap with an orthographic projection of the fingerprint identification structure on the cover plate.

5. The display device according to claim 1, wherein a sound field region radiated to the cover plate by each of the plurality of ultrasonic emission units comprises a main lobe region and a side lobe region surrounding the main lobe region, side lobe regions radiated to the cover plate by two adjacent ones of the plurality of ultrasonic emission units are adjacent to each other or partially overlap with each other; or main lobe regions radiated to the cover plate by two adjacent ones of the plurality of ultrasonic emission units are adjacent to each other or partially overlap with each other.

6. A fingerprint identification structure, comprising:
an ultrasonic emission component, comprising a plurality of ultrasonic emission units arranged in a two-dimensional array in directions parallel to a plane;
an ultrasonic detection component, comprising a plurality of ultrasonic detection units arranged in a two-dimensional array in the directions parallel to the plane, and
an insulating layer parallel to the plane,
wherein the ultrasonic emission component and the ultrasonic detection component are two independent structures, and an orthographic projection of at least one of the plurality of ultrasonic detection units on the plane is between orthographic projections of two adjacent ones of the plurality of ultrasonic emission units on the plane;
the ultrasonic emission component and the ultrasonic detection component are respectively located on both sides of the insulating layer; or, the ultrasonic emission component and the ultrasonic detection component are located on a same side of the insulating layer, and the ultrasonic emission component and the ultrasonic detection component are located in a same layer;
in the direction parallel to the plane, a minimum size of each of the plurality of ultrasonic emission units is not less than 500 μm.

7. The fingerprint identification structure according to claim 6, wherein a piezoelectric strain constant of the first piezoelectric layer is greater than a piezoelectric strain constant of the second piezoelectric layer, and a piezoelectric voltage constant of the second piezoelectric layer is greater than a piezoelectric voltage constant of the first piezoelectric layer.

8. The fingerprint identification structure according to claim 7, wherein a material of the first piezoelectric layer comprises lead zirconate-titanate piezoelectric ceramic or aluminum nitride, and a material of the second piezoelectric layer comprises polyvinylidene fluoride.

9. The fingerprint identification structure according to claim 6, wherein a distance between two adjacent ones of the plurality of ultrasonic emission units is in a range of 500 μm-5 mm.

10. The fingerprint identification structure according to claim 6, wherein the ultrasonic emission component and the ultrasonic detection component are respectively located on both sides of the insulating layer, and orthographic projections of at least two of the plurality of ultrasonic detection units on the plane are located in an orthographic projection of one ultrasound emission unit on the plane.

11. The fingerprint identification structure according to claim 6, wherein, in the direction parallel to the plane, each of the plurality of ultrasonic emission units comprises a plurality of ultrasonic emission sub-units.

12. The fingerprint identification structure according to claim 6, wherein the insulating layer is a base substrate, and at least one of the ultrasonic emission component and the ultrasonic detection component is attached to the base substrate.

13. The fingerprint identification structure according to claim 6, wherein the ultrasonic emission component and the ultrasonic detection component are located on the same side of the insulating layer, the ultrasonic detection component comprises a plurality of ultrasonic detection unit groups, each of the plurality of ultrasonic detection unit groups comprises at least one ultrasonic detection unit, and in the direction parallel to the plane, the plurality of ultrasonic emission units and the plurality of ultrasonic detection unit groups are arranged alternately.

14. The fingerprint identification structure according to claim 6, wherein each of the plurality of ultrasonic emission units comprises a first electrode, a first piezoelectric layer, and a second electrode which are stacked in sequence, and each of the plurality of ultrasonic detection units comprises a third electrode, a second piezoelectric layer, and a fourth electrode which are stacked in sequence;

the first piezoelectric layer and the second piezoelectric layer are two independent structures, the first electrode and one of the third electrode and the fourth electrode are two independent structures, and the second electrode and the other of the third electrode and the fourth electrode are two independent structures.

15. A fingerprint identification structure, comprising:

an ultrasonic emission component, comprising a plurality of ultrasonic emission units arranged in a two-dimensional array in directions parallel to a plane;

an ultrasonic detection component, comprising a plurality of ultrasonic detection units arranged in a two-dimensional array in the directions parallel to the plane, and an insulating layer parallel to the plane, wherein the ultrasonic emission component and the ultrasonic detection component are two independent structures, and an orthographic projection of at least one of the plurality of ultrasonic detection units on the plane is between orthographic projections of two adjacent ones of the plurality of ultrasonic emission units on the plane;

the ultrasonic emission component and the ultrasonic detection component are respectively located on both sides of the insulating layer; or, the ultrasonic emission component and the ultrasonic detection component are located on a same side of the insulating layer, and the ultrasonic emission component and the ultrasonic detection component are located in a same layer;

in the direction parallel to the plane, a maximum size of each of the plurality of ultrasonic emission units is less than 100 μm.

16. The fingerprint identification structure according to claim 15, wherein a distance between two adjacent ones of the plurality of ultrasonic emission units is in a range of 500 μm-1 mm.

17. The fingerprint identification structure according to claim 15, wherein each of the plurality of ultrasonic emission units comprises a first electrode, a first piezoelectric layer, and a second electrode which are stacked in sequence, and each of the plurality of ultrasonic detection units comprises a third electrode, a second piezoelectric layer, and a fourth electrode which are stacked in sequence;

the first piezoelectric layer and the second piezoelectric layer are two independent structures, the first electrode and one of the third electrode and the fourth electrode are two independent structures, and the second electrode and the other of the third electrode and the fourth electrode are two independent structures.

18. The fingerprint identification structure according to claim 15, wherein a piezoelectric strain constant of the first piezoelectric layer is greater than a piezoelectric strain constant of the second piezoelectric layer, and a piezoelectric voltage constant of the second piezoelectric layer is greater than a piezoelectric voltage constant of the first piezoelectric layer.

19. The fingerprint identification structure according to claim 18, wherein a material of the first piezoelectric layer comprises lead zirconate-titanate piezoelectric ceramic or aluminum nitride, and a material of the second piezoelectric layer comprises polyvinylidene fluoride.

\* \* \* \* \*